United States Patent [19]

Basse

[11] Patent Number: 5,643,118

[45] Date of Patent: Jul. 1, 1997

[54] BELT

[75] Inventor: Hartwig Basse, Nordenham, Germany

[73] Assignee: Norddeutsche Seekabelwerke GmbH, Nordenham, Germany

[21] Appl. No.: 598,059

[22] Filed: Feb. 7, 1996

Related U.S. Application Data

[63] Continuation of Ser. No. 264,464, Jun. 23, 1994, abandoned.

[30] Foreign Application Priority Data

Jun. 24, 1993 [DE] Germany ..................... 43 20 974.2

[51] Int. Cl.$^6$ ..................................... F16G 1/00
[52] U.S. Cl. ............................................. 474/237
[58] Field of Search .......................... 474/237, 239, 474/261, 264, 268, 271, 273

[56] References Cited

U.S. PATENT DOCUMENTS

| | | | |
|---|---|---|---|
| 1,667,120 | 4/1928 | Keiser | 474/237 |
| 2,240,735 | 5/1941 | Yelm et al. | 74/238 |
| 2,411,027 | 11/1946 | Crosby | 474/262 X |
| 2,429,993 | 11/1947 | Crosby | 474/261 X |
| 2,598,829 | 6/1952 | Pollard | 57/141 |
| 3,784,427 | 1/1974 | Griffin | 474/262 X |
| 4,131,030 | 12/1978 | White, Jr. | 74/232 |
| 4,239,566 | 12/1980 | Howerton | 474/260 X |

FOREIGN PATENT DOCUMENTS

| | | | |
|---|---|---|---|
| 394141 | 11/1908 | France | F16H 7/04 |
| 1070221 | 7/1954 | France . | |
| 36568 | 1/1886 | Germany | F16G 1/00 |
| 100932 | 4/1898 | Germany . | |
| 323713 | 6/1918 | Germany . | |
| 566388 | 12/1932 | Germany | 47/5 |
| 568467 | 1/1933 | Germany | 47/5 |
| 1820785 | 8/1960 | Germany | 580/60 |
| 2919913 | 11/1979 | Germany . | |
| 9301106 | 7/1993 | Germany . | |
| 58542 | 11/1911 | Switzerland | 81/2 |
| 606107 | 8/1945 | United Kingdom | F16G 9/00 |

*Primary Examiner*—Roger J. Schoeppel
*Attorney, Agent, or Firm*—Deveau, Colton & Marquis

[57] ABSTRACT

Belts (10) are known which have a main body (11) having a smooth circumferential surface (12) on which a profiling is arranged. According to the invention the profiling is formed by an envelope body (13) surrounding the circumferential surface (12) of the main body (11). The belt (10) can thus transmit heavy driving and conveying forces. The belt (10) is therefore particularly suitable as a driving or conveyor belt.

16 Claims, 2 Drawing Sheets

BELT

This is a continuation of application Ser. No. 08/264,464 filed on Jun. 23, 1994 abandoned.

DESCRIPTION

The invention relates to a belt according to the pre-characterizing clauses of Patent Claims 1 and 13. Belts of this kind are used as driving belts or as conveyor belts, particularly for conveying parceled goods.

Known belts of this kind usually have a smooth circumferential surface. They are therefore not suitable for transmitting heavier forces. For that reason such belts have already been provided with profiling in the form of threads wound onto the belt (U.S. Pat. No. 2,598,829). However, by this means it was still not possible to achieve substantially improved properties in comparison with belts having a smooth circumferential surface. In addition, winding threads onto the belt entails high manufacturing costs.

The object on which the invention is based is the provision of a belt of the type first mentioned above which permits the transmission of heavy forces (driving or conveying forces) and in addition can be produced at low cost.

According to the invention this object is achieved with a belt having the features of Claim 1. By means of an envelope body surrounding the main body, effective profiling of the belt is obtained, which permits the transmission of relatively heavy forces. The envelope body ensures simple production of the profiling, because it can be applied in a simple manner over the main body of the belt.

The envelope body is preferably in the form of a netting tube having at least two intercrossing strands and is not joined to the main body of the belt. Because of the net-like structure of the envelope body, effective profiling of the belt is possible. The separate envelope body in the form of a netting tube need only be pushed onto the main body of the belt.

The intercrossing strands are preferably joined to one another at all common crossing points, so that the envelope body can be formed with good inherent stability, which in addition on the one hand assists the transmission of forces and on the other hand facilitates the arrangement of the envelope body on the main body of the belt.

Owing to the fact that, according to another aspect of the invention, the strands are arranged in different layers and the strands of the one layer preferably intercross with those of the other layer, the envelope body has a thickness corresponding approximately to the thickness of the two layers, whereby the formation of an effective profiling is additionally assisted.

It is furthermore in the spirit of the invention for the strands of the respective layers to be spaced apart, so that the envelope body has deep recesses and thus a distinct profiling. The recesses can cooperate with corresponding surface configurations of the parceled goods which are to be conveyed, but also with the belt pulley driving the belt. Because of the additional positive engagement possible between the elements mentioned, the transmission of forces is further improved.

In a special development of the invention the envelope body is a tube which, in order to form the profiling, is provided with external projections and/or depressions. The main body of the belt is thus provided with effective profiling and in addition is always completely covered and thus to a very great extent protected against external influences.

Finally, provision is made for the envelope body to be given a smaller diameter than the main body. Relative movement between the main body and the envelope body is thus very largely excluded without joining them to one another, since the envelope body surrounds the main body under an initial stress. In this way the transmission of heavier forces is assisted without the direct joining of the envelope body to the main body. In order to achieve better holding of the envelope body on the main body, as an alternative or in addition the envelope body can be joined completely or in places to the main body, for example by thermal bonding of the two bodies.

Another belt for achieving the object has the features of Claim 13. This belt is provided with a profiling whose material properties at least partly differ from those of the main body. The material of the profiling preferably has a higher frictional resistance and/or lower hardness than the material of the main body. A high frictional resistance of the belt can thereby be achieved without the tensile strength of the latter being impaired.

Further features and advantages of the invention will emerge from the other claims and the description.

Preferred exemplary embodiments of the invention are explained more fully below with reference to the drawing, in which.

Figure 1:
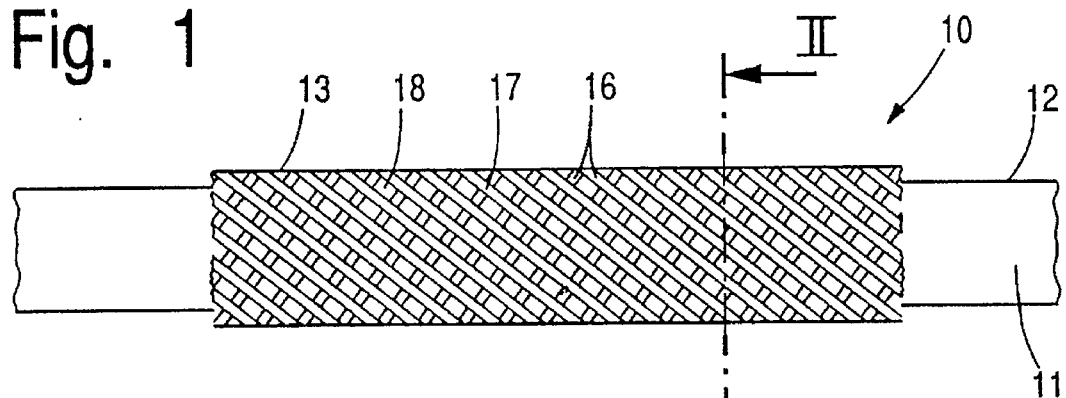
FIG. 1 is a schematic elevation of part of a belt.
Figure 2:
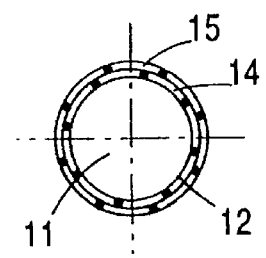
FIG. 2 is a section of the belt on the line II—II in FIG. 1.

A belt 10, shown in FIGS. 1 and 2, for conveying parceled goods comprises a main body 11 having a smooth circumferential surface 12, which is surrounded by a separate envelope body 13 forming a profiling. The envelope body 13 here always surrounds the main body 11 completely in the peripheral and longitudinal directions. In FIG. 1 the structure of the belt 10 can be seen, the belt 10, in the form of an endless belt, being shown partially in such a manner that (in order to facilitate its illustration) its main body 11 projects on both sides [lacuna] the envelope body 12, of which only part is shown.

The main body 11 is composed of an elastomer, particularly a plastic material. The hardness of the elastomer or plastic material is so selected that the main body 11 has a high tensile strength. In order to increase its tensile strength it is also possible to provide the main body 11 with reinforcing inserts, for example in the form of a steel rope.

The envelope body 13 is formed as a netting tube and has two layers 14, 15, each consisting of a plurality of preferably identical strands 16. Because the strands 16 are distributed over different layers 14 and 15, the strands 16 of the one layer lie in a different plane than the strands 16 of the other layer 15, the strands of the different layers 14, 15 being in contact with one another in places. The strands 16 of the respective layers 14, 15 extend parallel to one another and helically, the strands 16 of the inner layer 14 being helically arranged oppositely to those of the outer layer 15. Because of the orientation of the strands 16 in opposite directions, a multiplicity of strand crossing points 17 are formed, at which the strands 16 of the inner layer 14 are joined to those of the outer layer 15. Because of the many crossing points 17 of the strands 16, the envelope body 13 has good stability of shape, which on the one hand facilitates the fitting of the envelope body 13 on the main body 11 and on the other hand secures the structure of the profiling, the strands 16 being thus immovable relative to one another.

Apart from the fact that they extend oppositely in the adjoining layers 14, 15, the strands 16 in the belt 10 have the same pitch and, within the respective layer 14, 15, are also always spaced equidistantly apart. The distances between the strands 16 in each of the two layers 14, 15 are preferably equal. The envelope body 13 thus acquires uniform recesses 18 in the form of equilateral parallelograms. The strands 16 symmetrically arranged in this manner give the envelope body 13 a profiling having good stability of shape.

The envelope body 13 or the strands 16 are composed of elastomer material which has different physical properties from those of the material of the main body 11. The material of the envelope body 13 is preferably softer than that of the main body 11. The envelope body 13 thus has high frictional resistance on the one hand relative to the main body 11, and on the other hand relative to the parceled goods which are to be conveyed and also to the driving belt pulley, thus assisting transmission of heavy forces. A relative movement between the main body 11 and the envelope body 13 is additionally reduced by increased frictional resistance of the envelope body 13. To prevent relative movements between the envelope body 13 and the main body 11, the envelope body 13 is arranged on the main body 11 with elastic initial stress. To this end the envelope body 13 has an inside diameter slightly smaller than the outside diameter of the main body 11. It is however also conceivable for the envelope body 13 to be made fast to the main body 11. This connection is made by the strands 16 of the inner layer 14, preferably by a thermal process. With such a connection between the envelope body 13 and the main body 11, it is also possible, if desired, to dispense with the elastic initial stress of the envelope body 13 on the main body 13 [sic].

Besides the selection of the material for the envelope body 13 or its strands 16, the properties of the belt 10 are in addition also determined by the manner in which the strands 16 are arranged in relation to one another, that is by the configuration of the profiling of the envelope body 13 or the belt 10, as well as by the cross section of the strands 16. Depending on the object to be achieved in each particular case, the most diverse modifications are possible. Thus, the cross section of the strands 16 may for example be triangular, circular, elliptical or rectangular, while the cross section of all the strands 16 of both the outer layer 15 and the inner layer 14 is approximately the same.

The recesses 18 formed by the strands 16, which intercross in the two layers 14, 15, do more than enable effective profiling of the envelope body 13 or of the belt 10 to be formed: they may have additional importance in the transmission of forces, particularly when the recesses 18 in the envelope body 13 cooperate with corresponding profiling of the driving belt pulley and/or of the parceled goods, and thus additionally permit positive transmission of forces.

Figure 3:
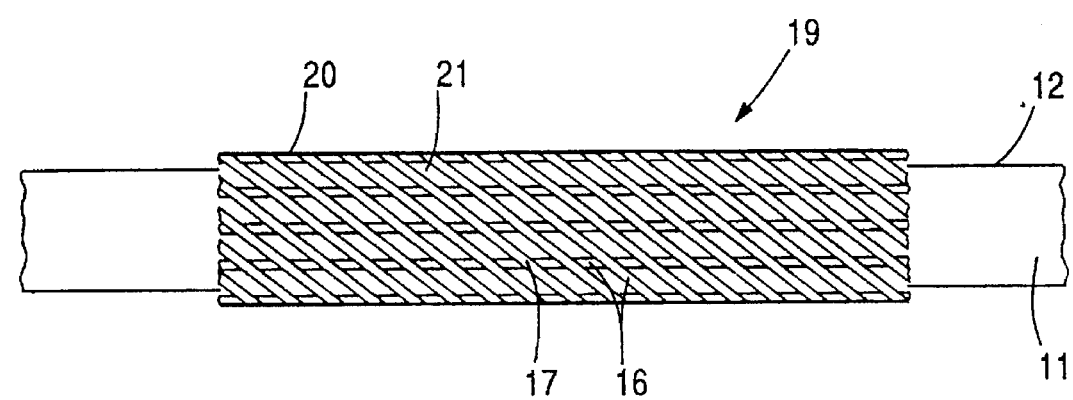
FIG. 3 shows a second exemplary embodiment of a belt in a view similar to FIG. 1.

Further formations of the profiling and concomitant modified configurations of the recesses 18, which result from the respective paths followed by the strands 16, are indicated in the following exemplary embodiments:

A belt 19 shown in FIG. 3 has a different envelope body 20 with the same main body 11. The strands 16 in the inner layer 14 extend in the axial direction of the envelope body 20 and are arranged parallel with uniform spacing. The strands 16 in the outer layer 15, on the other hand, extend helically, similarly to the strands 16 in the layer 15 of the previously described belt 10. Here again the strands 16 of the inner layer 14 have a multiplicity of crossing points 17 with those of the outer layer 15, at which points the strands 16 are joined to one another.

Because of the intercrossing strands 16, which in both layers 14, 15 once again have the same lateral spacing in relation to one another, the envelope body 20 is also provided with recesses 21 having the shape of equilateral parallelograms.

The shape of the recesses 18, 21 is always dependent on the path followed by the strands 16, the angle at which they intercross, and the manner in which they are spaced apart within the respective layer 14, 15.

Figure 4:
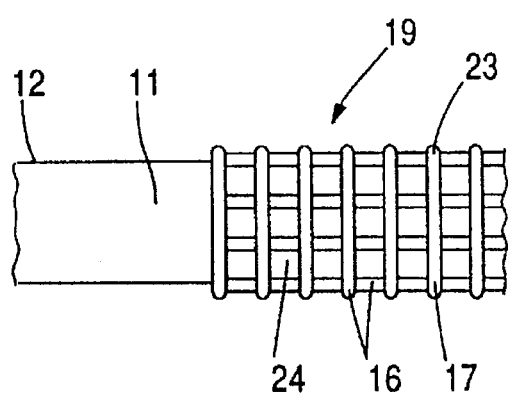
FIG. 4 shows a third exemplary embodiment of a belt in a view similar to FIG. 1.

In a belt 22 illustrated in FIG. 4 the main body 11 is surrounded by an envelope body 23 whose strands 16 in the inner layer 14 likewise extend in the axial direction of the envelope body 23 or main body 11, while the strands 16 in the outer layer 15 are in the form of circular rings extending transversely to the axial direction of the envelope body 23 or of the main body 11, with their longitudinal center lines lying on the longitudinal axis of the main body 11. The strands 16, which thus intercross at right angles, form rectangular recesses 24 which moreover are square if the distances between successive strands 16 are the same in both layers 14, 15.

Figure 5:
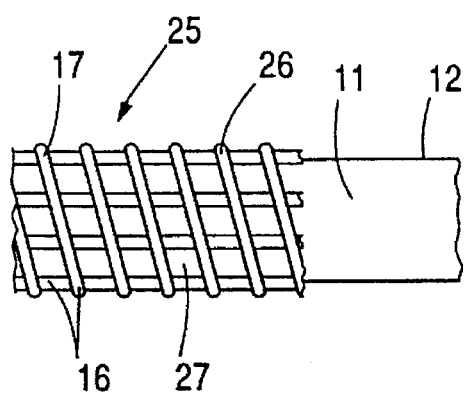
FIG. 5 shows a fourth exemplary embodiment of a belt in a view similar to FIG. 1.

A belt 25 illustrated in FIG. 5 differs from the belt 22 previously described in that the strands 16 in the outer layer 15 of an envelope body 26 are inclined relative to the main body 11 and thus form elliptical rings whose longitudinal center lines intersect the longitudinal axis of the main body 11 at an angle. Recesses 27 in the envelope body 26 are once again in the form of parallelograms.

Figure 6:
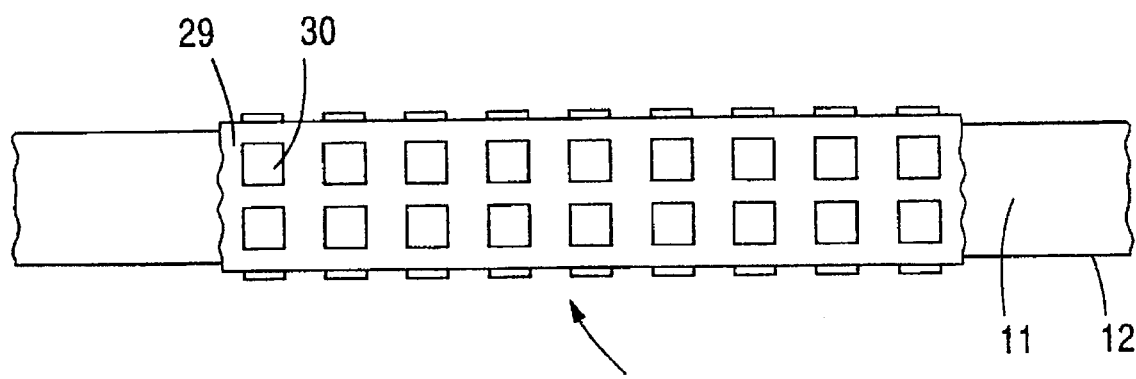
FIG. 6 shows a fifth exemplary embodiment of a belt in a view similar to FIG. 1.

Finally, a belt 28 in another exemplary embodiment of the invention (FIG. 6) has an envelope body 29 which is in the form of a closed tube completely surrounding the main body 11. The profiling of the envelope body 29 or of the belt 28 is formed by projections 30 standing out from the outer side of the envelope body 29. The projections 30 are rectangular in shape and arranged uniformly on the envelope body 29. They may however also have various other configurations.

According to another embodiment (not illustrated) it is in addition possible for the profiling to be formed by providing, instead of the projections 30, depressions which can likewise have the most diverse configurations corresponding to requirements in each particular case.

I claim:

1. A belt comprising:
    a main body having a smooth circumferential surface; and
    a tube surrounding the circumferential surface of the main body, wherein the tube and the main body are each separately formed as individual parts.

2. A belt according to claim 1, characterized in that the tube has an inside diameter and wherein the main body has an outside diameter and wherein the inside diameter of the tube is slightly smaller than the outside diameter of the main body.

3. A belt according to claim 1, characterized in that the separate tube is a netting tube having intercrossing strands.

4. A belt according to claim 3, characterized in that the intercrossing strands are joined to one another at their common crossing points.

5. A belt according to claim 3, characterized in that the strands are arranged in different layers or planes, wherein the strands of one of the layers intercross with the strands of another of the layers over the entire circumferential surface of the main body.

6. A belt according to claim 5, characterized in that the strands in each layer extend substantially parallel to one another.

7. A belt according to claim 5, characterized in that all of the strands of each layer are spaced apart.

8. A belt according to claim 5, characterized in that one of said different layers constitutes an outer layer and one of said different layers constitutes an inner layer and wherein the strands of the inner layer extend in the axial direction of the main body and the strands in the outer layer extend transversely to the axial direction of the main body.

9. A belt according to claim 5, characterized in that the strands of each of the layers have a uniform cross section.

10. A belt according to claim 3, characterized in that said strands have a cross section which is triangular, circular, elliptical or rectangular.

11. A belt according to claim 1, characterized in that the tube is at least partly joined to the main body.

12. A belt comprising a main body having a smooth circumferential surface and an envelope body surrounding the circumferential surface of the main body, wherein the envelope body has an inside diameter and wherein the main body has an outside diameter, and wherein the inside diameter of the envelope body is slightly smaller than the outside diameter of the main body.

13. A belt comprising a main body and an envelope body arranged on the main body, wherein the main body and the envelope body are composed of materials having different properties and the material of the envelope body has a higher frictional resistance than the material of the main body.

14. A belt according to claim 13, characterized in that the material of the envelope body has a lower hardness than the material of the main body.

15. A belt comprising a main body having a smooth circumferential surface and an envelope body surrounding the circumferential surface of the main body, wherein the envelope body is in the form of a netting tube having intercrossing strands that are joined to one another at their common crossing points.

16. A belt comprising a main body having a smooth circumferential surface and an envelope body surrounding the circumferential surface of the main body, wherein the envelope body is in the form of a netting tube having intercrossing strands, and wherein the strands are arranged in different layers or planes such that one of the layers constitutes an inner layer and one of the layers constitutes an outer layer, and wherein the strands of the inner layer intercross the strands of the outer layer, and wherein the strands of the inner layer extend in the axial direction of the main body, and wherein the strands of the outer layer extend transversely to the axial direction of the main body.

* * * * *